No. 881,698. PATENTED MAR. 10, 1908.
H. R. KUEFFER.
BELT GUIDE.
APPLICATION FILED OCT. 5, 1907.
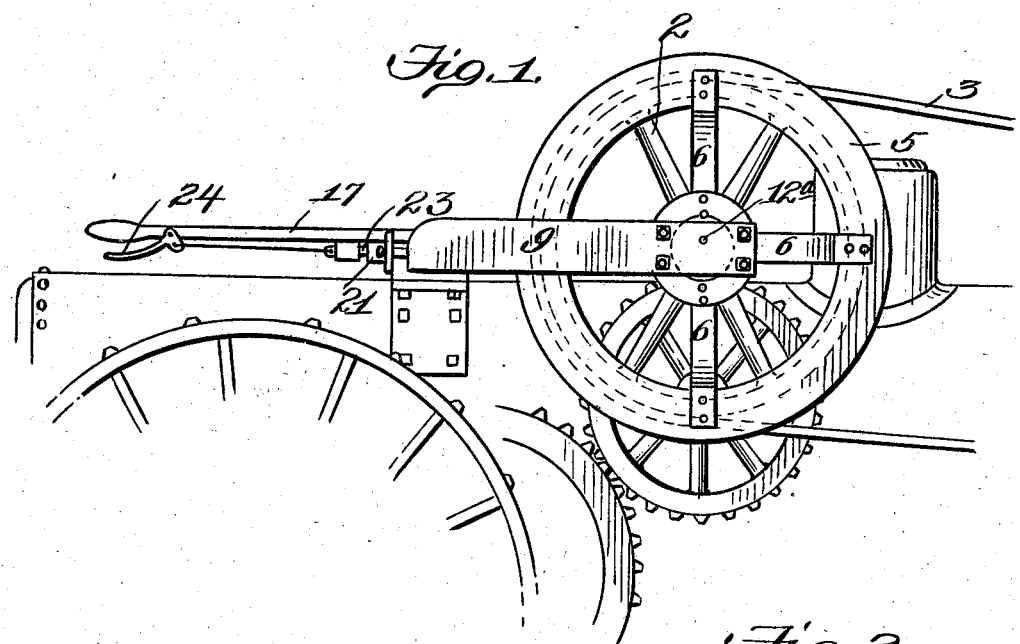
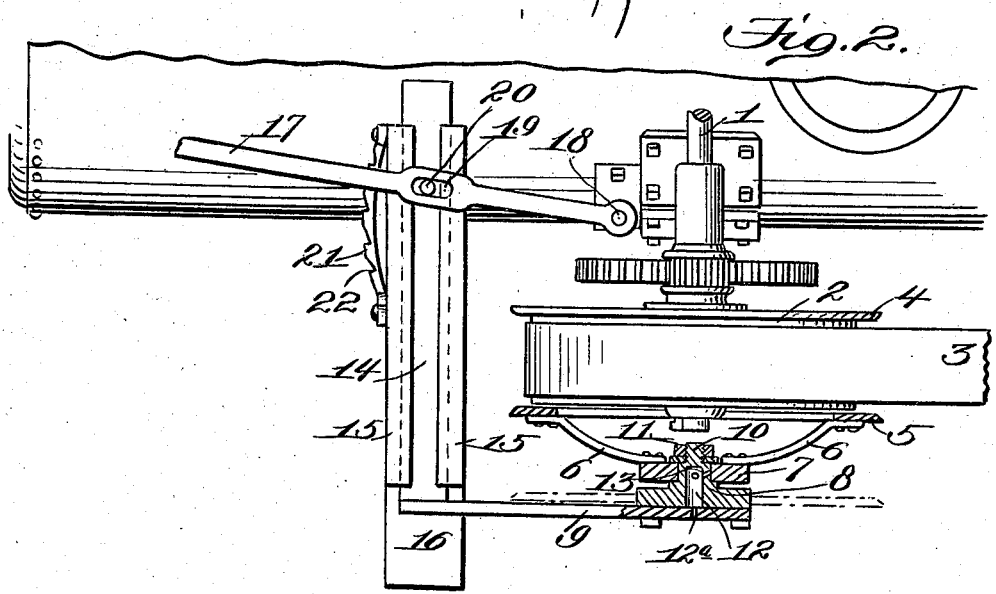
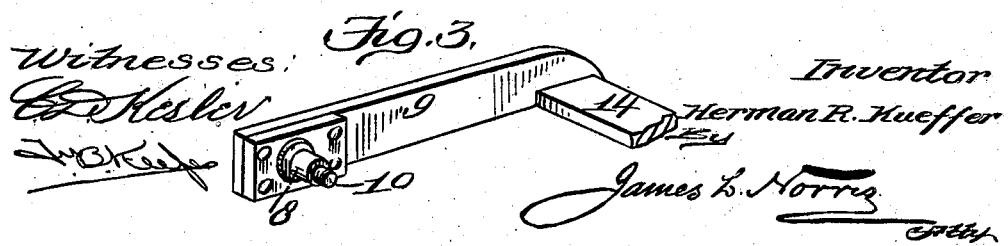
Witnesses:
Inventor
Herman R. Kueffer
James L. Norris
Atty.
THE NORRIS PETERS CO., WASHINGTON, D. C.

UNITED STATES PATENT OFFICE.

HERMAN R. KUEFFER, OF WELLMANVILLE, KANSAS.

BELT-GUIDE.

No. 881,698.  Specification of Letters Patent.  Patented March 10, 1908.

Application filed October 5, 1907. Serial No. 396,046.

*To all whom it may concern:*

Be it known that I, HERMAN R. KUEFFER, a citizen of the United States, residing at Wellmanville, in the county of Ness and State of Kansas, have invented new and useful Improvements in Belt-Guides, of which the following is a specification.

My present invention relates to improvements in belt guides, and is especially adapted for use in connection with threshers and similar apparatus wherein a very long belt is used and which, by reason of the action of wind and other causes, renders it difficult to position and retain the belt on the fly wheel of the engine.

The object of the invention primarily, is to provide a belt guiding device that is capable of being readily adjusted in coöperative relation with the belt pulley to position or retain the belt thereon, and when it is desirable to remove the belt, the guide may be quickly moved out of operative position relatively to the belt wheel.

Another object of the invention is to provide a belt guide of this character that is so arranged relatively to the belt wheel and the belt, that when in operative position, the belt cannot become disengaged from the belt wheel whether the wheel turns in either direction, and in placing the engine relatively to the thresher, the guide serves to position the belt about the circumference of the belt wheel.

A further object is to provide an improved belt guide that is capable of being applied universally to engines and belt wheels of various kinds, and which is simple in construction, enabling it to be made cheaply and in practice, it is not liable to get out of order.

In the drawing—Figure 1 is a side elevation of a portion of a threshing machine engine having a belt wheel provided with a belt guide constructed in accordance with my present invention; Fig. 2 is a plan view of a portion of the engine, showing the belt guide applied to the fly wheel thereof; and Fig. 3 is a perspective view of a portion of the carrier for shifting the belt guide into and out of operative positions relatively to the fly wheel.

Similar parts are designated by the same reference characters in the several views.

It will be understood, of course, that belt guides constructed in accordance with the present invention are capable of being applied to belt wheels generally wherein it is desirable or necessary to position and retain the belt thereon, and in such cases where it is necessary to frequently remove and replace the belt relatively to the wheel, the invention being particularly applicable, however, to the fly wheels of engines of the type used generally in operating threshers and similar apparatus, it being necessary in those cases to frequently change the positions of the engine and thresher, and such changes involve a removal and replacing of the belt which serves to transmit the power from the engine to the thresher. The belt guide, according to my invention, serves to position the belt on the fly wheel of the engine while the latter is being backed into proper position relatively to the thresher, and if so desired, it may remain in coöperative relation with the fly wheel for the purpose of retaining the belt thereon during the operation of the engine, as the slipping off of the belt by reason of wind, slugs in the thresher or lack of alinement between the engine and thresher has proved to be an annoyance.

The invention in the present instance is shown in connection with an ordinary engine of the type used generally in operating threshers and similar apparatus, it having an engine shaft 1 carrying the fly wheel 2 which for the present purposes will be termed a belt wheel, as it usually receives the belt 3 which serves to transmit power from the engine to the thresher or other apparatus to be driven, and the belt wheel is provided at one edge, preferably its inner edge, with a relatively fixed peripheral flange 4 which is adapted to coöperate with the inner edge of the belt and thereby prevent its slipping off the belt wheel and becoming entangled in the gears which serve to propel the engine. The belt guide in the present embodiment of the invention, constitutes in effect a relatively movable outer flange member, the latter being adjustable in a direction substantially axially of the belt wheel so that it may be moved clear of the outer edge of the wheel and thereby permit the belt to be applied and removed relatively thereto, and it may be moved into coöperative relation with the outer edge of the belt wheel to position or retain the belt thereon.

In that form of the invention shown in the accompanying drawing, the belt guide is composed of an annular member 5 which lies in a plane parallel to the plane of rotation of the belt wheel and is of such a diameter that its periphery projects a suitable distance beyond the belt receiving surface of the belt wheel so as to provide a guiding flange similar to the flange 4. This annular member may be in the form of a ring in order to accommodate the engine shaft or other parts which may project at the outer side of the belt wheel, and it is supported by a set of arms 6 which in turn are secured to a bearing member 7, and the latter is revolubly mounted on a suitable journal 8 which is secured to a carrier 9, the inner end of the journal being preferably provided with a threaded portion 10 to receive a nut 11, the latter serving to retain the bearing in proper position. An oil chamber 12 may be formed in the journal if so desired, and provided with a channel 13 which leads to the bearing surfaces whereby proper lubrication may be secured, the chamber 12 being adapted to receive a quantity of oil and waste packing, and a reduced inlet $12^a$ permits introduction of oil to the chamber by an oil can.

The carrier which supports the belt guide may be of any suitable construction, but I prefer to employ a carrier similar to that shown in the present instance which comprises an arm supporting the journal and a slide 14 arranged substantially at right-angles to the arm and mounted to reciprocate in guides 15 which extend in a direction substantially parallel to the axis of the belt wheel and are supported on an arm 16 which is bolted to the boiler or other relatively fixed part of the engine and projects laterally thereof. A longitudinal movement of the slide relatively to its coöperating guides will obviously cause the flange member constituting the belt guide to move into and out of coöperative relation with the belt wheel in a direction axially of the latter, the guide being shown in operative position relatively thereto by the full lines in Fig. 2, and the dotted lines in this figure indicate the position that would be occupied by the guide when moved out of coöperative relation with the belt wheel. When the guide is in this position the belt may be readily applied or removed relatively to the wheel, although when the guide is in coöperative relation with the belt wheel, it will serve in effect as a flange which, coöperating with the inner stationary flange on the wheel, will prevent the belt from leaving the wheel because of wind, abnormal resistance due to slugs in the thresher, or to lack of alinement between the engine and the thresher or other driven part.

Any suitable device may be employed for reciprocating the carrier for the purpose of moving the belt guide to and from operative positions, a lever 17 being preferably employed which may be fulcrumed to a relatively fixed part of the engine as at 18, and it is provided in the present instance with a slot 19 to receive an operating pin 20, carried by the slide 14 on the carrier, a pivotal movement of the lever obviously causing a reciprocatory movement of the carrier that will serve to move the belt guide into and out of coöperative relation with the belt wheel.

If so desired, suitable means may be employed for retaining the belt guide in operative and inoperative positions, a sector 21 being provided in the present instance to receive a locking bolt 23 carried by the operating lever, the bolt being controlled by a trip 24 arranged on the lever in convenient position relatively to the handle thereon, the latter being preferably so placed that it may be operated conveniently by the engine attendant.

Engines of this type equipped with belt guides constructed in accordance with the present invention, may be operated with greater economy, for the reason that the belt guide may be instantly adjusted so that the fly wheel may receive the belt, and after the latter has been applied, the belt guide may be quickly moved into coöperative relation with the wheel, and as the flange member of the guide extends around the entire circumference of the wheel, it will be impossible for the belt to slip off the wheel from the top, bottom or rear thereof while the engine is being positioned relatively to the thrasher or other apparatus. Ordinarily, it may be unnecessary to retain the belt guide in actual contact with the belt wheel, it being sufficient usually to set the guide in immediate proximity to but just out of contact with the outer edge of the wheel as shown in Fig. 2, the sector 21 being provided with a set of notches 22 which coöperate with the retaining bolt 23, one of these notches being preferably so placed that the bolt when coöperating therewith will set the guide in the desired position, and when the guide is almost in contact with the wheel, it need not necessarily turn therewith, but it will be in a position to engage the belt should the latter have a tendency to slip off the wheel. However, in windy weather or in those cases wherein considerable resistance is offered to the belt, or the belt wheels are not accurately alined, the belt guide may be so adjusted that it is in actual engagement with the belt wheel so that there is no possibility of the belt leaving it. In either case, however, the adjustable belt guide may be readily adjusted to permit the belt to be removed or replaced relatively to the belt wheel without slacking the tension or disturbing the relative position of the engine and the driven apparatus. Therefore, the delays which usually occur by reason of the running off of the belt and the like are avoided by the use of a belt guide embodying my invention, so that the engine may operate without interruption.

It will be understood, that while the invention is capable of being used to such advantage in connection with engines of the character shown and described, the invention is not so limited in its application, as it may be used in connection with belt wheels or pulleys of various kinds wherein it is desirable or necessary to position and retain a belt thereon, and it is necessary to frequently remove the belt therefrom, and it will also be understood that the invention is not limited to the precise construction shown, as changes may be made therein to adapt the belt guide to belt wheels or pulleys of different kinds and other changes may be made which would be included within the scope of the claims.

I claim as my invention—

1. A belt guide comprising an annular member co-axial with a belt wheel and movable to and from operative position relatively to the belt wheel in a direction axially of the latter and means for causing the axial movements of the guide.

2. A guide for belt wheels, comprising a flange member co-axial with and adapted to coöperate with one edge of a belt wheel, and means for guiding the said member in a direction axially of the belt wheel.

3. A guide for belt wheels comprising an annular member journaled co-axially of the wheel and movable into and out of coöperative relation with one of its edges by a relative movement axially of the wheel.

4. A device of the class described, embodying a belt wheel having a relatively fixed flange on one of its edges, and an adjustable member adapted to coöperate with the opposite edge of the wheel as a flange and movable in a direction axially of the wheel.

5. A device of the character described, embodying a belt wheel, a member adapted to coöperate with one of its edges as a belt flange, and a carrier for supporting the annular member and moving it into and out of coöperative relation with the belt wheel by a movement axially of the latter.

6. The combination with a belt wheel, of a belt guide embodying an annular member journaled concentrically with the wheel and adapted to coöperate with the latter as a belt guiding flange, and a carrier mounted to reciprocate in a direction substantially parallel to the axis of the wheel and serving as a support for the annular member.

7. A guide for belt wheels comprising an annular member arranged concentrically with the wheel and adapted to coöperate with one of the edges of the wheel, a slidable carrier supporting the said member, and means for retaining the said member in operative and inoperative position relatively to the wheel.

8. An adjustable guide for belt wheels comprising an annular belt engaging member adapted to coöperate with one of the edges of the wheel, a slidable carrier for supporting the said member, a lever for reciprocating the carrier, and a device carried by the lever for locking the carrier in operative and inoperative positions.

9. The combination with a belt wheel, of a belt guide comprising an annular member of a greater diameter than that of the wheel and adapted to coöperate with one of its edges, a bearing arranged in alinement with the axis of the wheel for supporting the said member, and a carrier slidable substantially parallel to the axis of the wheel and serving to support said bearing.

10. A belt guide for engines of the character described, comprising an annular member adapted to coöperate with one of the edges of the wheel as a belt engaging flange and having a bearing arranged in alinement with the axis of the wheel, a carrier slidable in a direction parallel to the axis of the wheel, and a journal carried by the carrier and adapted to coöperate with the bearing of the said member.

11. In a belt guide of the character described, the combination with a belt wheel, of an annular member of a diameter greater than that of the wheel and adapted to coöperate with one of its edges as a belt guiding flange, radial arms connected to the said member, a bearing connected to the said arms and arranged in alinement with the axis of the wheel, a carrier connected to the said bearing, and means for operating the carrier to move the annular member into and out of coöperative relation with the wheel.

12. In a belt guide of the character described, the combination with a belt wheel, of an annular member arranged to coöperate with one of its edges as a belt guiding flange, a carrier slidable in a direction parallel to the axis of the wheel and supporting the annular member, a lever connected to the carrier for reciprocating it, and a device coöperating with the said lever for retaining the belt guiding member in operative and inoperative positions.

In testimony whereof I have hereunto set my hand in presence of two subscribing witnesses.

HERMAN R. KUEFFER.

Witnesses:
JAMES L. NORRIS, Jr.,
CHAS. S. HYER.